United States Patent [19]

Keith

[11] 4,265,046
[45] May 5, 1981

[54] ROD HOLDER DEVICE

[76] Inventor: W. Louis Keith, 609 SE. 52nd Ave., Ocala, Fla. 32670

[21] Appl. No.: 63,998

[22] Filed: Aug. 2, 1979

[51] Int. Cl.³ .............................................. A01K 87/00
[52] U.S. Cl. .......................................... 43/21.2; 43/25
[58] Field of Search ...................... 43/21.2, 25, 26, 23

[56] References Cited

U.S. PATENT DOCUMENTS

| | | | |
|---|---|---|---|
| 764,398 | 7/1904 | Upton | 43/26 X |
| 2,241,183 | 5/1941 | Ceder | 43/23 |
| 3,113,363 | 12/1963 | Fyrie | 43/25 X |
| 3,992,799 | 11/1976 | Oakes | 43/25 |

*Primary Examiner*—Nicholas P. Godici
*Attorney, Agent, or Firm*—Duckworth, Hobby, Allen & Pettis

[57] ABSTRACT

A rod holder device useful in combination with a plural section fishing rod for holding at least one of the rod sections in substantially parallel relation to the main body of the fishing rod. The device is primarily useful for storing and transporting a plural section fishing rod in its taken apart condition, and is preferably integrally mounted on the fishing rod handle. The rod holder device comprises a receiver body movably attached to the fishing rod as by a pivot pin, and the receiver body is movable between first and second positions defining a closed and opened condition, respectively. A receiver aperture is formed in the receiver body and is operatively disposed when the device is in its second position. The receiver aperture is dimensioned and configured to receive, preferably, the male end of a rod section therein.

8 Claims, 5 Drawing Figures

U.S. Patent   May 5, 1981   4,265,046
FIG. 1
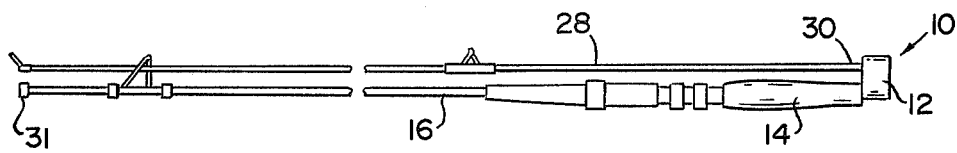
FIG. 2
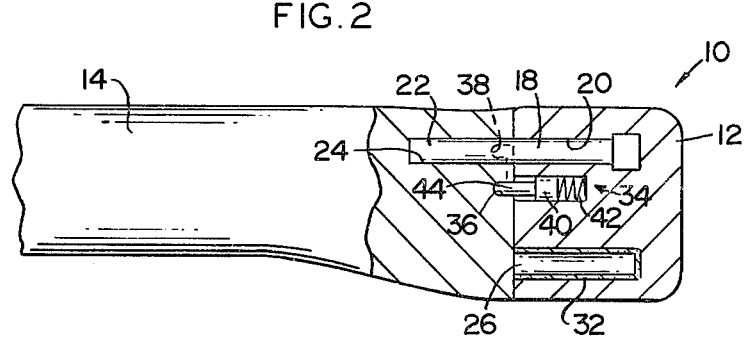
FIG. 3
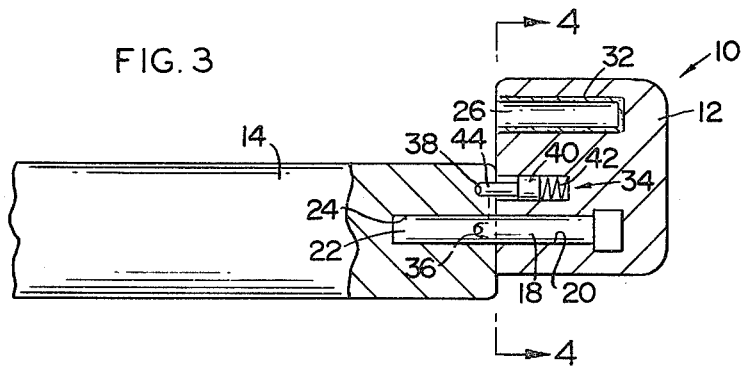
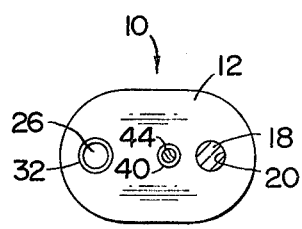
FIG. 4
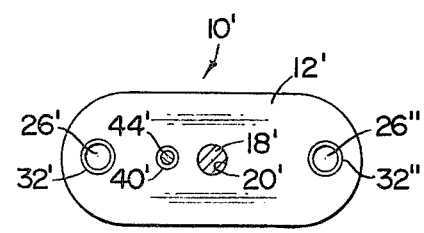
FIG. 5

ROD HOLDER DEVICE

BACKGROUND OF THE INVENTION

1. Field of the Invention

The present invention for a rod holder device comprises receiver head means attached to a fishing rod and including receiver means formed in said receiver head means to retain one end of a rod section therein. In the preferred construction the receiver head means is movably attached to the handle of the fishing rod and may be placed in either a closed or opened position. In the opened position the receiver means is disposed to accept and retain one end of a rod section therein. In the closed position the rod holder device defines a continuous segment of the fishing rod handle and does not interfere with normal operation and use of the fishing rod.

2. Description of the Prior Art

As any fisherman knows, many fishing rods, and particularly fly rods and spinning rods, are formed from plural rod sections. There are normally two or three such sections with one defining the main body including the handle and the other section or sections being matingly engageable with corresponding male and female end portions to provide assembly and use of the complete rod. The necessity of means for storing and transporting such rods in their taken apart condition has been recognized, and a variety of solutions to this need are known. For example, carrying cases including distinct receptacles for each section of a fishing rod are well known. Similarly, rod bags having a plurality of pockets formed therein are also commonly used for the storage of plural section fishing rods. However, neither these cases nor bags conveniently provide for transportation of the rods in their taken apart condition in the field, but are primarily intended for storage purposes.

In recognition of the need for means of transporting the rod in its taken apart condition short of leaving the rod in its storage container, devices have been created for clipping demountable rod sections to the rod main body. One of the earliest such prior art devices is shown in U.S. Pat. No. 396,909 to Annin and basically comprises a groove formed in the rod handle for receiving a portion of the rod section therein, and a clip device secured to the rod main body for engaging a forward portion of the rod section. Similar clamping devices are taught in the following U.S. Pat. Nos.: 3,169,290 to Snodgrass; 3,113,363 to Fyvie; and 3,832,796 to Cardwell. Finally U.S. Pat. No. 3,992,799 to Oakes discloses a removable socket-type apparatus attachable to the butt end of a fishing rod and including means for retaining a rod section thereadjacent. While each of these prior art devices is clearly useful for its intended purpose, each of these devices is just as clearly of a removable, add-on construction. In order to use the fishing rods in their assembled condition, it is necessary to remove at least a portion of the section-retaining mechanism so as to allow unhindered use of the fishing rod. The very fact that these prior art devices are removable further detracts from their efficacy, for once a device is removed from primary equipment it is often forgotten or misplaced.

It is therefore clear that there is a great need in the art for a rod holder device for retaining secondary sections of a plural section fishing rod wherein the device is integrally formed or mounted onto the rod's main body in substantially permanent fashion. It is furthermore desirable that such a device be selectively movable between closed and opened positions so as to not to interfere with the normal use of the rod when all its sections are assembled. Because of the adverse conditions under which fishing rods are often utilized, any such device must be of strong construction and relatively impervious to the effects of both fresh and salt water. Yet, as with virtually all articles of manufacture, the device should be capable of relatively inexpensive manufacture and must be easy to install and operate.

SUMMARY OF THE INVENTION

The present invention relates to a rod holder device for use in combination with a plural section fishing rod for holding one of the rod sections adjacent, and substantially parallel to, the main body of the rod. The rod holder device comprises receiver head means attached to the rod and, preferably, to the rod handle. Receiver means comprises at least aperture dimensioned and configured to retain one end of a rod section therein are formed on the receiver head means, and the receiver means may further comprise a lining formed from a deformable material so as to accept rod tip sections of varying diameter.

In order to facilitate both the operation and use of the rod holder device, the receiver head means is preferably attached to the rod handle by a pivotal connecting pin. Accordingly, the receiver head means is movable between first and second positions comprising closed and opened positions, respectively. The receiver means is formed on the receiver head means so as to be positioned for use in retaining a rod section when the receiver head means is disposed in its second, or opened, position.

In order to maintain the device of this invention in either its first or second position, the device further comprises detent means operatively disposed on the receiver head means and engageable with first and second stop means formed on the rod handle. Positioning the receiver head means so that the detent means engages the first stop means corresponds to the first, or closed, position of the device. Pivoting the receiver head means so that the detent means engages the second stop means holds the device in its opened position.

From this summary description it should be apparent that when the rod holder device is in its first position, the fishing rod can be normally assembled and utilized virtually without regard to the device installed on the rod handle. Then, when it is desired to disassemble the fishing rod, the device is pivoted to its second position, the rod section, or sections, are removed, and the male portion of each rod section is inserted into one of the receiver means apertures. While the apertures are dimensioned to receive and retain the male section therein, it should also be noted that the longitudinal axis of the aperture is oriented such that while the rod section will be substantially parallel to the rod main body, there might be a slight deflection angle so as to allow the forward portion of the rod section to clear the fishing reel and/or line guide mounted on the main body.

The invention accordingly comprises the features of construction, combination of elements, and arrangement of parts will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a plan view of a two-section fishing rod showing the section placed in the rod holder device of this invention.

FIG. 2 is an elevational view, partially in section to show interior detail, of a preferred construction for the rod holder device in its closed position.

FIG. 3 is a plan view of the device shown in FIG. 2 in its opened position.

FIG. 4 is a sectional view taken along line 4—4 of FIG. 3.

FIG. 5 is a sectional view similar to that of FIG. 4 showing a second embodiment of the device comprising retainer means for two rod sections.

Similar reference characters refer to similar parts throughout the several views of the drawings.

DETAILED DESCRIPTION

As best seen in the views of FIGS. 1, 2 and 3, the rod holder device of the present invention is generally indicated as 10 and in the preferred embodiment of the drawings comprises a receiver head means 12 attached to rod handle 14 formed on rod main body 16. Receiver head means 12 is movably attached to rod handle 14 as by pivot pin 18 operatively mounted within receiver pivot channel 20 and attached to pivot socket 22 mounted within socket channel 24 formed in handle 14. By virtue of this construction, receiver head means 12 of rod holder device 10 may be moved from a first, or closed, position as shown in FIG. 2 to a second, or opened, position as shown in FIG. 3.

Rod holder device 10 further comprises receiver means defined by at least one aperture 26 formed in receiver head means 12. The receiver means aperture 26 is dimensioned and configured to retain one end of rod section 28 therein, and preferably receives male end 30 of rod section 28. It is to be understood that male end 30 of rod section 28 is operatively disposed within female end 31 of rod main body 16 for normal use of the fishing rod. With particular regard to the views of FIGS. 2 and 3, it can be seen therein that in this preferred embodiment for rod holder device 10 the receiver means further comprises a lining 32 formed from a deformable material such as, for example, cork, rubber or felt. Lining 32 not only facilitates both the insertion and removal of male end 30 of rod section 28, but also allows for the retention of rod section tips of varying diameter.

In order to provide for positive placement of rod holder device 10 in its closed and opened positions as shown in FIGS. 2 and 3, respectively, device 10 further comprises detent means generally indicated as 34 operatively disposed on receiver head means 12 and first and second stop means 36 and 38 formed on rod handle 14. Detent means 34 comprises a detent pin 40 and biasing means 42, with biasing means 42 mounted between pin 40 and receiver head means 12 so as to urge tip 44 of pin 40 outwardly from receiver head means 12. As shown in the view of FIG. 2, when rod holder device 10 is in the first, or closed, position tip 44 will engage first stop means 36 and hold device 10 in this position with regard to rod handle 14. In the second, or opened, position shown in FIG. 3 tip 44 now engages second stop means 38. First and second stop means 36 and 38 are defined by recesses formed in rod handle 14. While detent means 34 is illustrated as comprising a pin-type construction, it is to be understood that the scope of the invention is not limited thereto. For example, a ball-type construction could also be utilized. Furthermore, it is to be understood that it might be desirable to provide a radial channel, or guide, between first stop means 36 and second means 38 to facilitate the movement of rod holder device 10 between its first and second positions.

While the views of FIGS. 1-4 illustrate a preferred construction for rod holder device 10 wherein the fishing rod includes just one section 28 in addition to main body 16, attention is now invited to the view of FIG. 5. The view of FIG. 5 is equivalent to that of FIG. 4, but represents a second embodiment for device 10 capable of retaining two rod sections. Structural elements shown in the view of FIG. 5 which correspond to elements already discussed with regard to FIGS. 1-4 have been designated with corresponding reference numerals with the addition of a prime mark. The second receiver means in this embodiment has been indicated by the use of a double prime. As can be seen in the view of FIG. 5, pivot pin 8' is placed substantially at the midpoint of receiver head means 12' so that in the second, or opened, position, one aperture 26' will be placed along one side of the fishing rod, and the second aperture 26" will be correspondingly disposed on the other side of the fishing rod. Thus, the two removable sections of a three-part fishing rod could be held by the embodiment of FIG. 5. It is to be understood that while most fishing rods sold today are either of a two part or three part construction, the scope of this invention is not to be limited thereto. That is to say, rod holder device 10 could be constructed for the purpose of retaining more than two rod sections.

It is also to be understood that while the invention has been described with particular regard to a construction whereby receiver head means 12 is disposed on the after end of rod handle 14, this is not a limiting factor to the scope of the invention. For example, depending upon the rod construction and configuration, it might be desirable to place receiver head means 12 intermediate of two sections of rod handle 14. This could be easily accomplished as by extending pivot pin 18 through receiver head means 12 into engagement with a second pivot socket disposed within the second handle section. In a construction such as this the receiver head means 12 would pivot with respect to each of the two, fixed handle parts.

It will thus be seen that the objects set forth above, among those made apparent from the preceding description, are efficiently attained and since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A rod holder device for use in combination with a plural section fishing rod for holding one of the rod sections, said device comprising: receiver head means pivotally attached to the rod handle and moveable between first and second positions; and receiver means formed in said receiver head means, said receiver means comprising at least one aperature dimensioned and configured to retain one end of a rod section therein, said first position defining a closed configuration and said second position defining an opened position, whereby at least one rod section may be releasably held in said receiver means in substantially parallel relation to the main body of the fishing rod.

2. A rod holder device as in claim 1 wherein said receiver means comprises N-1 apertures, wherein N equals the total number of rod sections including the main body of the fishing rod.

3. A rod holder device as in claim 1 wherein said aperture is dimensioned and configured to retain the male end of a rod section therein.

4. A rod holder device as in claim 1 further comprising pin means disposed in pivoting, interconnecting relation between said receiver head means and the rod handle, the axis of said pin means defining the pivot point about which said receiver head means is moved between said first and second positions.

5. A rod holder device as in claim 4 further comprising detent means operatively disposed on said receiver head means and first and second stop means formed on the rod handle, one end of said detent means being selectively engageable with a corresponding one of said first and second stop means to maintain said receiver head means selectively in said first and second positions.

6. A rod holder device as in claim 5 wherein said detent means comprises a pin and biasing means mounted between said pin and said receiver head means so as to urge said pin outwardly from said receiver head means toward the rod handle into selective engagement with said first and second stop means.

7. A rod holder device as in claim 5 wherein said receiver means comprises N-1 apertures, wherein N equals the total number of rod sections including the main body of the fishing rod.

8. A rod holder device as in claim 7 wherein said receiver means further comprises a lining of deformable material disposed within said apertures whereby rod section ends of varying diameters may be retained therein.

* * * * *